United States Patent

[11] 3,541,974

[72] Inventor John Harry Clapham Atkins
              Westwood, England
[21] Appl. No. 721,397
[22] Filed April 15, 1968
[45] Patented Nov. 24, 1970
[73] Assignee Baker Perkins Incorporated
              Saginaw, Michigan
[32] Priority April 18, 1967
[33]          Great Britain
[31]          No. 17796/67

[54] MOULDING APPARATUS
     7 Claims, 3 Drawing Figs.
[52] U.S. Cl. .................................................... 107/8,
                                                  107/15; 18/21
[51] Int. Cl. ........................................................ A21c 11/4

[50] Field of Search............................................. 107/15.5,
              15.6, 15.7, 15.9, 1.1, 1.5, 14.P, 8all; 18/21, 2(RA);
              118/24, 25

[56]                    References Cited
                  UNITED STATES PATENTS
     222,135  12/1879  Hoffman ......................  107/15.7
   2,424,949   7/1947  White............................   107/1.5

Primary Examiner—Walter A. Scheel
Assistant Examiner—Robert I. Smith
Attorney—Learman, Learman and Mc Culloch ABSTRACT: A rotary drum pie moulder and depositor in which dough pieces are ejected from die cavities in the drum by compressed air acting internally of the drum and progressively over the base of the cavities whereby the dough pieces are ejected with a peeling action.

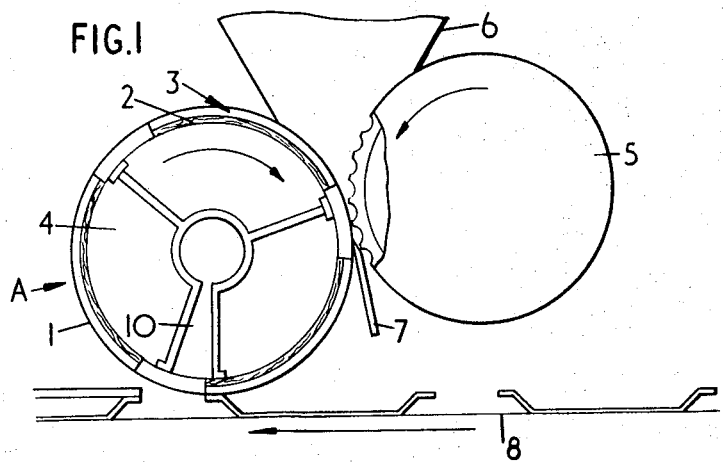
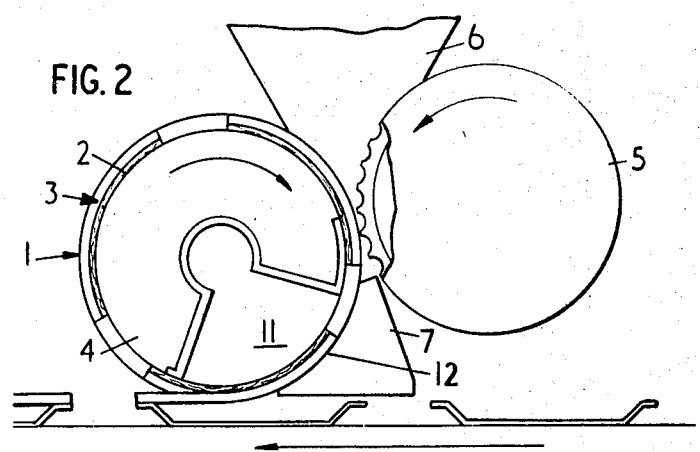
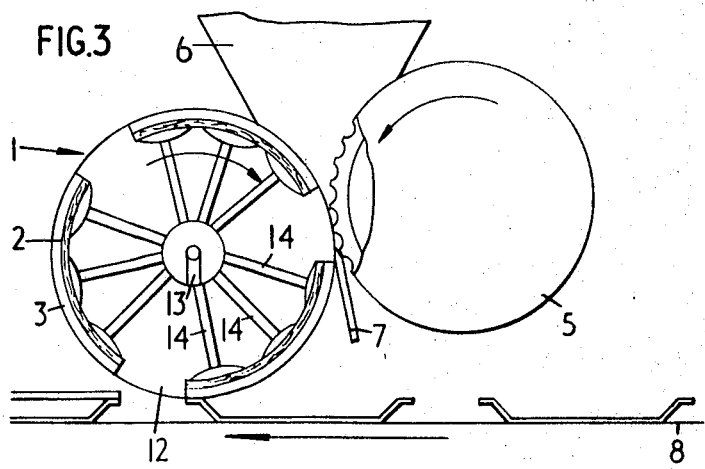
INVENTOR
JOHN H.C. ATKINS
BY Learman, Learman
& McCulloch.
ATTORNEYS

MOULDING APPARATUS

The invention relates to apparatus for moulding plastic material such as baker's dough into required shapes and for ejecting the shaped material from a moulding cavity.

An object of the invention is to provide an apparatus as set out above, useful for shaping pie bases and depositing same into individual pie moulds or alternatively shaping pie lids for accurate positioning onto pie bases, previously filled with fruit, meat or other foods, supported by individual pie moulds.

The invention consists in moulding apparatus for plastic materials comprising a rotary drum having at least one moulding cavity in its surface, means for filling the cavity with material to be moulded and duct means internally of the drum for causing fluid to issue from the base of the filled cavity progressively over the peripheral length of the cavity to eject the moulded material from the cavity with a peeling action.

The invention will now be described by way of example with reference to the lidding of meat or other pies in individual tins or foils.

In the drawings:

FIG. 1 is a diagrammatic side view of one form of moulding and depositing apparatus according to the invention, FIG. 2 is a diagrammatic side view of an alternative form of apparatus according to the invention, and FIG. 3 is a diagrammatic side view of a further alternative form of apparatus according to the invention.

The different apparatus shown in the FIGS. having various features in common referred to by like reference characters. Thus in each embodiment, a moulding drum 1 having a plurality of moulding cavities 3 around its surface, each with a perforate or a porous base 2, is adapted to rotate around a fixed inner core 4. The moulding drum cooperates with a ribbed rotary feed drum 5 so that during rotation of the drums the feed drum presses dough from a hopper 6 into the mould cavities and excess dough is removed from the moulding drum surface by a doctor 7. On further rotation of the drum a mould cavity gradually comes into register with pressurized air ducting in the stationary core (as will be described in more detail hereafter) which causes a dough moulding to be ejected from its cavity with a gradual peeling action onto a pie tin or foil oncoming on a feed conveyor 8.

The moulded pie lids are deposited on their respective tins or foils with a peeling action and different systems can be employed for achieving this. In FIG. 1 the fixed inner core 4 has a radially extending compressed air duct 10 leading from a compressed air source, which duct 10 is circumferentially narrow with respect to the moulding cavities 2 so that as a cavity rotates about the core, it passes progressively under the influence of ejecting air. A similar effect is achieved with the arrangement shown in FIG. 2 where the fixed core has a circumferentially wide radially extending compressed air duct 11 substantially the width of the cavity 3 but the rear or trailing portion of this is rendered ineffective to release the moulding by the circumferentially extended doctor surface 12 so that the moulding is gradually released as it progressively passes under the front end of duct 11.

In the FIG. 3 arrangement, inner core 12 rotates with the drum about a central shaft having a radial compressed air supply duct 13. The core has a series of radial ducts 14 each terminating in pockets communicating with different parts of the moulding cavities so that a moulding is released progressively as each successive duct 14 is brought into communication with duct 13.

To ensure accurate depositing of the moulded pie lids onto their respective containers or pie bases lining the containers, alignment of the front of a container with the front of a die cavity is required at the commencement of depositing and the containers must move at the same linear speed as the outer surface of the moulding drum. With the outer surface of the moulding drum moving at the same linear speed as the container conveyor it is necessary to ensure, for example through photoelectric sensing means or the like, that the spacing between the end of one container and the beginning of the next is equal to the circumferential distance between the end of one moulding cavity and the beginning of the next on the moulding drum. Suitable stops and timing control means may be provided to accurately interspace the containers on the conveyor, and means such as converging guides may be provided to accurately laterally aline tins, foils or trays for example with the mould cavities. Alternatively retractable container arresting fingers operated from cams associated with the moulding drum may be provided to release a container in timed relation with movements of the moulding drum.

The invention can be employed for placing pie bases or lids on pie bases in individual tins or foils or for multiple placing in individual pie moulds which are incorporated in trays or for example in containers attached to endless chain conveyors.

I claim:

1. Apparatus for molding dough material comprising a movable mold member having at least one molding cavity in its surface, said cavity including a perforate base; means for introducing material to be molded to said cavity; and duct means internally of the mold member for causing fluid under pressure to issue through said perforate base of said cavity progressively over the length of the cavity to eject the molded material from the cavity with a peeling action.

2. Apparatus as set forth in claim 1 wherein the movable mold member comprises a rotary drum including a rotary outer shell containing the molding cavity and said duct means includes a stationary inner core having a fluid duct of peripherally narrower extent than the molding cavity for directing said fluid toward said shell.

3. Apparatus as set forth in claim 1 wherein said duct means includes a plurality of radially extending ducts leading inwardly from the base of the cavity, said ducts being longitudinally spaced along said perforate base.

4. Apparatus as set forth in claim 3 wherein said duct means includes a stationary core having fluid passage means for successively registering with said ducts.

5. Apparatus as set forth in claim 1 including a material feeding hopper, said movable mold member comprising a rotary drum; said cavity filling means comprising a rotary feed roll cooperating with the rotary molding drum and the material hopper.

6. Apparatus as set forth in claim 1 wherein the movable mold member comprises a rotary drum including a rotary outer shell containing the molding cavity; said duct means including a stationary inner core with a radially extending fluid duct; and stationary doctor means having a surface provided for cooperating with the outer surface of the shell over the trailing portion of the fluid duct and being in peripheral overlapping relation with said duct.

7. Apparatus as set forth in claim 6 wherein the duct is of substantially the same peripheral extent as the molding cavity.